United States Patent
Matsumoto

[19]

[11] Patent Number: 6,020,673
[45] Date of Patent: Feb. 1, 2000

[54] DRIVE METHOD AND DRIVE DEVICE OF VIBRATION ACTUATOR

[75] Inventor: Tsuyoshi Matsumoto, Tokyo, Japan

[73] Assignee: Nikon Corporation, Tokyo, Japan

[21] Appl. No.: 08/995,162

[22] Filed: Dec. 19, 1997

[30] Foreign Application Priority Data

Dec. 20, 1996 [JP] Japan .................................. 8-341169
Oct. 15, 1997 [JP] Japan .................................. 9-281768

[51] Int. Cl.⁷ ............................................ H01L 41/08
[52] U.S. Cl. ...................................................... 310/316.02
[58] Field of Search ............................. 310/328, 323.03, 310/316.01, 316.02; 318/116

[56] References Cited

U.S. PATENT DOCUMENTS

| | | | |
|---|---|---|---|
| 4,560,263 | 12/1985 | Katsuma et al. | 310/316.02 X |
| 4,794,294 | 12/1988 | Shimizu et al. | 310/316.02 |
| 5,039,899 | 8/1991 | Yamaguchi | 310/323 |
| 5,101,132 | 3/1992 | Yamaguchi | 310/323 |
| 5,136,200 | 8/1992 | Takizawa et al. | 310/323 |
| 5,140,215 | 8/1992 | Yamaguchi | 310/323 |
| 5,191,688 | 3/1993 | Takizawa et al. | 310/323 |
| 5,200,665 | 4/1993 | Iijima | 310/323 |
| 5,210,454 | 5/1993 | Naito | 310/316.02 |
| 5,247,220 | 9/1993 | Miyazawa et al. | 310/316.02 X |
| 5,336,958 | 8/1994 | Saya et al. | 310/316.02 |
| 5,416,375 | 5/1995 | Funakubo et al. | 310/323 |
| 5,592,041 | 1/1997 | Kasuga et al. | 310/316.02 |
| 5,619,089 | 4/1997 | Suzuki et al. | 310/316.02 X |
| 5,770,912 | 6/1998 | Suzuki et al. | 310/316.02 |

FOREIGN PATENT DOCUMENTS

| | | | |
|---|---|---|---|
| 63-277477 | 11/1988 | Japan . | |
| 0234072 | 9/1989 | Japan | 310/316.02 |
| 406090574 | 3/1994 | Japan | 310/316.02 |
| 7-143771 | 6/1995 | Japan . | |

OTHER PUBLICATIONS

Piczoelectric Linear Motors for Application to Driving a Light Pick–Up Element, Y. Tomikawa et al., Preceedings of 5ᵗʰ Symposium on Dynamics Related to Electromagnetic Force, pp. 393–398 (1993)(translation). (No Month).

New Ultrasonic Motors, S. Ueha et al., Triceps Publications, pp. 145–146 (1991)(translation). (No Month).

Ultrasonic Motors, by S. Ueha et al., Oxford Univ. Press (1993), pp. 131–135 and 191–196. (No Month).

*Primary Examiner*—Mark O. Budd
*Attorney, Agent, or Firm*—Oliff & Berridge, PLC

[57] ABSTRACT

In order to make micro-movement possible using burst signals (pulses), a vibration actuator that includes an elastic member and a plurality of piezoelectric members attached to the elastic member is operable in a first drive mode and in a second drove mode. In the first drive mode, two-phase drive signals are provided to the piezoelectric members. In the second mode, one-phase drive signals are supplied to one of the plurality of piezoelectric elements in the form of burst signals.

17 Claims, 5 Drawing Sheets

6,020,673

DRIVE METHOD AND DRIVE DEVICE OF VIBRATION ACTUATOR

BACKGROUND OF THE INVENTION

1. Field of Invention

The present invention relates to a drive method and drive device of a vibration actuator having an electromechanical conversion element, and to driving the vibration actuator by generating vibrations in an elastic member by inducing vibration of the electromechanical conversion element.

2. Description of Related Art

FIG. 4 is a perspective view showing one example of a conventional drive device of a vibration actuator. The vibration actuator includes an elastic member 1 formed into a rectangular shape and having force output members 1a and 1b formed on its lower surface. Piezoelectric members 2a and 2b, which are electromechanical conversion elements, are attached to the upper surface of the elastic member 1. The driving force is generated using elliptical movement generated in the force output members 1a and 1b. This is achieved by applying alternating current voltage to the piezoelectric members 2a and 2b and harmonically causing longitudinal vibration and bending vibration in the elastic member 1.

The drive circuit of the vibration actuator includes an oscillator 101, a phase shifter 102, and amplifiers 103 and 104. The oscillator 101 outputs an oscillating alternating current voltage at a fixed frequency. The phase shifter 102 causes the phase of the alternating current of the oscillator 101 to differ by 9°. The amplifier 103 amplifies the output of the phase shifter 102 and applies it to the piezoelectric member 2a. The amplifier 104 amplifies the output of the oscillator 101 and applies it to the piezoelectric member 2b.

When an alternating current voltage having a frequency very close to the inherent frequency of a first-order longitudinal vibration and a fourth-order bending vibration of the elastic member 1 is applied to the vibration actuator in two phases, a harmonic vibration composed of two vibrations is generated so that the device can function as a motor. Force output members 1a and 1b are provided in the parts that become the antinodes of the fourth-order bending vibration, and propulsion (driving force) is generated by an elliptical movement that occurs at the ends of the force output members 1a and 1b.

The structure and load characteristics of such a vibration actuator are disclosed in "Piezoelectric Linear Motors for Application to Driving a Pickup Element," Y. Tomikawa, et al, Proceedings of Fifth Symposium on Dynamics Related to Electromagnetic Force, pp. 393–398, the disclosure of which is incorporated herein by reference.

A movable device is disclosed in "New Ultrasonic Motor," S. Ueha and Y. Tomikawa, Triceps Publication, pp. 145–146, the disclosure of which is incorporated herein by reference.

However, the conventional drive device of a vibration actuator described above has a problem that, when a small number of bursts of oscillating waves (non-continuous waves) are applied as drive signals for micro-movement (small amounts of movement), it moves in the direction opposite to that when continuous waves are applied.

FIG. 5 is a drawing showing the relationship between number of bursts of waves (pulses) and the distance and direction of movement of the drive device of a vibration actuator according to the conventional example.

In the case of this example, when the number of burst waves is from about 10 to about 60 bursts, movement occurs in the direction opposite to that of continuous waves. When the number of burst waves is about 60 bursts or more, movement occurs in the same direction as that of continuous waves. Accordingly, in such a conventional drive method, it was difficult to control micro-movement.

The aim of the present invention is to provide a drive method and drive device of a vibration actuator that facilitates micro-movement using burst signals.

SUMMARY OF THE INVENTION

In order to solve the above and other problems, one embodiment of the present invention relates to a drive method of a vibration actuator having an electromechanical conversion element (electromechanical converter) for converting electrical energy to mechanical displacement in which the driving force is obtained by applying drive signals to the electromechanical conversion element. A first electrical energy input member and a second electrical energy input member are provided on the electromechanical conversion element. Selection is made between a first drive mode and a second drive mode. The first drive mode causes vibration by applying a first drive signal to the first electrical energy input member, and by applying a second drive signal having a different electrical phase from the first drive signal to the second electrical energy input member. The second drive mode causes vibration by applying either the first drive signal or the second drive signal to either the first electrical energy input member or the second electrical energy input member.

In the second drive mode, the drive signals applied to the first electrical energy input member or to the second electrical energy input member can be burst waves. Also, in the second drive mode, it is possible to select either the first electrical energy input member or the second electrical energy input member according to the direction of driving of the vibration actuator, and to apply either the first drive signal or the second drive signal to the selected electrical energy input member.

Furthermore, in one embodiment of the present invention, a drive device of a vibration actuator includes a vibration actuator having an electromechanical conversion element with a first electrical energy input member and a second electrical energy input member being formed thereon to convert the input electrical energy into mechanical displacement. The driving force is obtained by applying drive signals to the electromechanical conversion element and causing vibration. A controller switches the vibration actuator between a first drive mode and a second drive mode. A drive circuit applies a first drive signal to the first electrical energy input member and applies a second drive signal to the second electrical energy input member when the controller is switched to the first drive mode, and applies either the first drive signal or the second drive signal to either the first electrical energy input member or to the second electrical energy input member when the controller is switched to the second drive mode.

The drive circuit can include an oscillator for generating a signal having a specified frequency and voltage, a switch having a first output terminal connected to the first electrical energy input member and a second output terminal connected to the second electrical energy input member, and a phase shifter connected between the second output terminal and the second electrical energy input member and causing the electrical phase of the input signal to be changed by a specified amount. The switch can be configured such that signals are output from both the first output terminal and the second output terminal when in the first drive mode, and signals are output from either the first output terminal or the second output terminal when in the second drive mode. Also, the drive circuit can be configured such that, when in the second drive mode, either the first electrical energy input member or the second electrical energy input member is selected according to the direction of driving of the vibration actuator, and the first drive signal or the second drive signal is applied to the selected electrical energy input member.

Furthermore, one embodiment of the present invention relates to a drive device of a vibration actuator having an electromechanical conversion element for converting electrical energy to mechanical displacement, and that obtains driving force by applying drive signals to the electromechanical conversion element and causing vibration. The drive device includes a first electrical energy input member and a second electrical energy input member formed on the aforementioned electromechanical conversion element of the vibration actuator, and a switch for switching between a first drive mode and a second drive mode. The first drive mode applies a first drive signal to the first electrical energy input member, and applies a second drive signal having a different electrical phase from the first drive signal to the second electrical energy input member. The second drive mode applies either the first drive signal or the second drive signal to either the first electrical energy input member or to the second electrical energy input member.

In this case, in the second drive mode, the device can be configured such that the drive signals applied to the first electrical energy input member or the second electrical energy input member are burst waves.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Embodiments of the present invention are explained in further detail below by referring to drawings, and the like.

Figure 1:
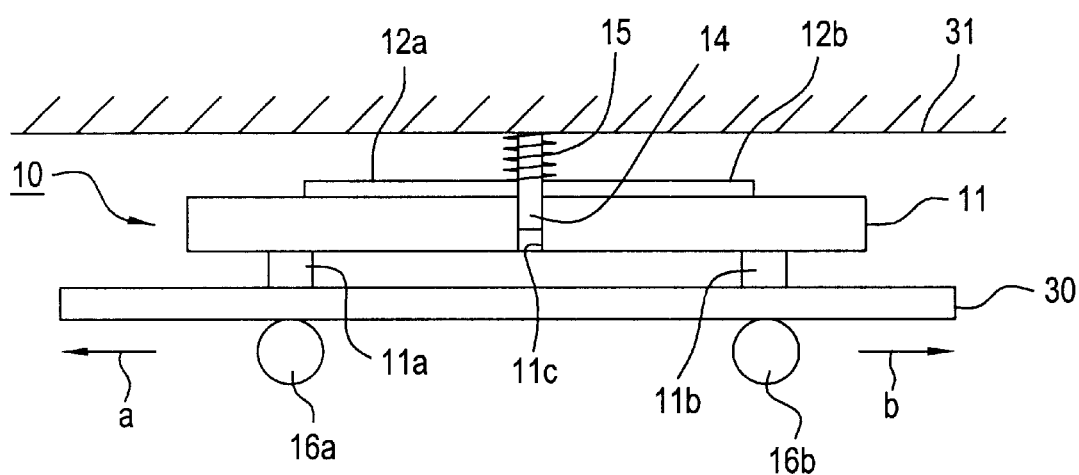
FIG. 1 is a side view showing the configuration of a vibration actuator according to one embodiment of the present invention.

FIG. 1 is a side view showing the configuration of a vibration actuator according to an embodiment of the present embodiment. The vibration actuator 10 of the present embodiment includes an elastic member 11 formed into a rectangular plate shape. Two piezoelectric members 12a, 12b, which function as electromechanical conversion elements, are attached to the upper surface of the elastic member 11. Force output members 11a and 11b protrude from the lower surface of the elastic member 11. Support notches 11c are formed on both side surfaces of the elastic member 11. Pin-shaped supporting members 14 are engaged with the notches 11c to position the elastic member 11 relative to the fixing mount 31. Pressing members 15 (e.g., springs) press the elastic member 11 against the side of a relative moving member 30, which is the driven object. Guide rollers 16a and 16b engage the relative moving member 30 at positions opposite the force output members 11a and 11b.

The elastic member 11 can be formed of a metal such as, e.g., stainless steel or a plastic, or the like. The force output members 11a and 11b can be formed of engineering plastic consisting of a composite material of polyflon (registered trademark: Daikin Kogyo K.K.), or the like, and also may be formed integrally with the elastic member 11. The pressing member 15 can be a coil spring that surrounds the supporting member 14. Alternatively, a plate spring or saucer-shaped spring, or the like, may be used in place of the coil spring. The guide rollers 16a and 16b are supported to be capable of rotation (i.e., they are rotatable) by a supporting member (not illustrated).

This vibration actuator 10 is made such that a first alternating current is applied to the piezoelectric member 12a, and a second alternating current is applied to the piezoelectric member 12b. The electrical phase of the second alternating current differs by 90° with respect to the aforementioned first alternating current. Also, the main body of the elastic member 11 is connected to GND potential.

In the vibration actuator 10 configured as described above, when the aforementioned first alternating current is applied to the piezoelectric member 12a, and the aforementioned second alternating current is applied to the piezoelectric member 12b, an elliptical movement is caused in the force output members 11a and 11b of the elastic member 11. Because the elastic member 11 is pressed in the direction of (i.e., toward) the relative moving member 30 by the pressing member 15, the force output members 11a and 11b and the relative moving member 30 become pressed into contact with each other. As is known, driving force is obtained due to the friction between the relative moving member 30 and the force output members 11a and 11b. Thus, the vibration actuator of the present embodiment functions as an ultrasonic motor, being configured so as to use vibrations in the ultrasonic region.

Figure 2:
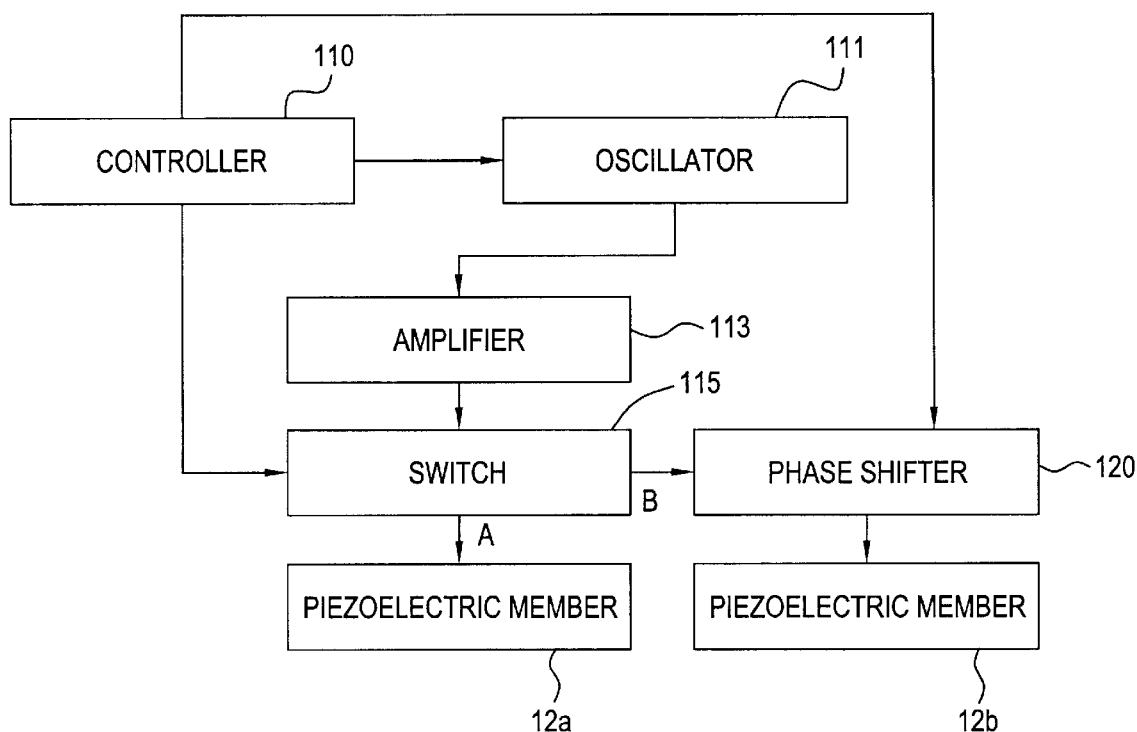
FIG. 2 is a block diagram showing the FIG. 1 embodiment of the vibration actuator according to the present invention.

FIG. 2 is a block diagram showing the circuit configuration of the drive device of the vibration actuator of the present embodiment. The circuit includes an oscillator 111, an amplifier 113, a switch 115, a controller 110, and a phase shifter 120. The oscillator 111 outputs oscillating drive signals having a specified frequency and voltage to the amplifier 113. The amplifier amplifies the output from the oscillator 111 and outputs to the switch 115. The switch 115 is configured to be capable of switching between three states: (1) connecting to the A side and the B side, thereby outputting the output of the amplifier 113 to the piezoelectric member 12a and to the piezoelectric member 12b; (2) connecting to only the A side, thereby outputting only to the piezoelectric member 12a; and (3) connecting to only the B side, thereby outputting only to the piezoelectric member 12b. The controller 110 controls the oscillator 111, the switch 115, and the phase shifter 120. The phase shifter 120 makes the electrical phase differ by 90° or -90° between the drive signals output from the switch 115 and applied to the piezoelectric member 12b (i.e., the second drive signals) and the drive signals output from the switch 115 and applied directly to the piezoelectric member 12a (i.e., the first drive signals).

In FIG. 1, when performing control by continuously driving the relative moving member 30 in the direction of the arrow a, the controller 110 outputs control signals to the oscillator 111 so as to output a continuous oscillating wave.

Also, the controller 110 outputs control signals to the switch 115 so as to connect to the A side and the B side and output the output from the amplifier 113 to both the piezoelectric member 12a and the piezoelectric member 12b. Furthermore, controller 100 outputs control signals to the phase shifter 120 to set the drive signals applied to the piezoelectric member 12b (second drive signals) and the drive signals applied to the piezoelectric member 12a (first drive signals) such that the electrical phase difference becomes 90°. By this manner of control, an elliptical movement is caused in the driving force output members 11a and 11b, and the relative moving member 30 is driven in the direction of the arrow a in FIG. 1. In an alternative configuration in which the relative moving member 30 is fixed and the vibration actuator 10 is movable in order to drive the vibration actuator 10 in the direction of the arrow a, the electrical phase difference between the aforementioned first drive signals and the aforementioned second drive signals should be set so as to become −90°.

When continuously driving the relative moving member 30 in the direction of the arrow b, the controller 110 outputs control signals to the oscillator 111 so that it outputs a continuous oscillating wave. Also, the controller 110 outputs control signals to the switch 115 so as to connect to the A side and the B side and output the output from the amplifier 113 to both the piezoelectric member 12a and the piezoelectric member 12b. Furthermore, controller 100 outputs control signals to the phase shifter 120 to set the drive signals applied to the piezoelectric member 12b (second drive signals) and the drive signals applied to the piezoelectric member 12a (first drive signals) such that the electrical phase difference becomes −90°. By this manner of control, an elliptical movement in the direction opposite to that when the aforementioned phase difference was set to 90° is caused in the driving force output members 11a and 11b. As a result, the relative moving member 30 is driven in the direction of the arrow b in FIG. 1. In an alternative configuration, in which the relative moving member 30 is fixed and the vibration actuator 10 is movable, in order to drive the vibration actuator 10 in the direction of the arrow b, the electrical phase difference between the aforementioned first drive signals and the aforementioned second drive signals should be set so as to become 90°.

When micro-driving (i.e., driving by a small distance—as opposed to continuous driving) the relative moving member 30 in the direction of the arrow a, the controller 110 outputs control signals to the oscillator 111 so as to output one or more bursts of oscillating waves. Also, the controller 110 outputs control signals to the switch 115 so as to connect to the A side and to output the output from the amplifier 113 only to the piezoelectric member 12a. The output from the switch 115 is applied to the piezoelectric member 12a as first drive signals. As a result, the relative moving member 30 is driven in the direction of the arrow a in FIG. 1. In an alternative configuration, in which the relative moving member 30 is fixed and the vibration actuator is movable, in order to drive the vibration actuator 10 in the direction of the arrow a, the control signals to the switch 15 should be set so as to connect to the B side and to output the output from the amplifier 113 only to the piezoelectric member 12b.

When micro-driving the relative moving member 30 in the direction of the arrow b, the controller 110 outputs control signals to the oscillator 111 so as to output one or more bursts of oscillating waves. Also, the controller 110 outputs control signals to the switch 115 so as to connect to the B side and to output the output from the amplifier 113 only to the piezoelectric member 12b. The output from the switch 115 is applied to the piezoelectric member 12b as second drive signals via the phase shifter 120. As a result, the relative moving member 30 is driven in the direction of the arrow b in FIG. 1. In an alternative configuration, in which the relative moving member 30 is fixed and the vibration actuator is movable, in order to drive the vibration actuator 10 in the direction of the arrow b, the control signals to the switch 115 should be set so as to connect to the A side and to output the output from the amplifier 113 only to the piezoelectric member 12a.

Figure 3:
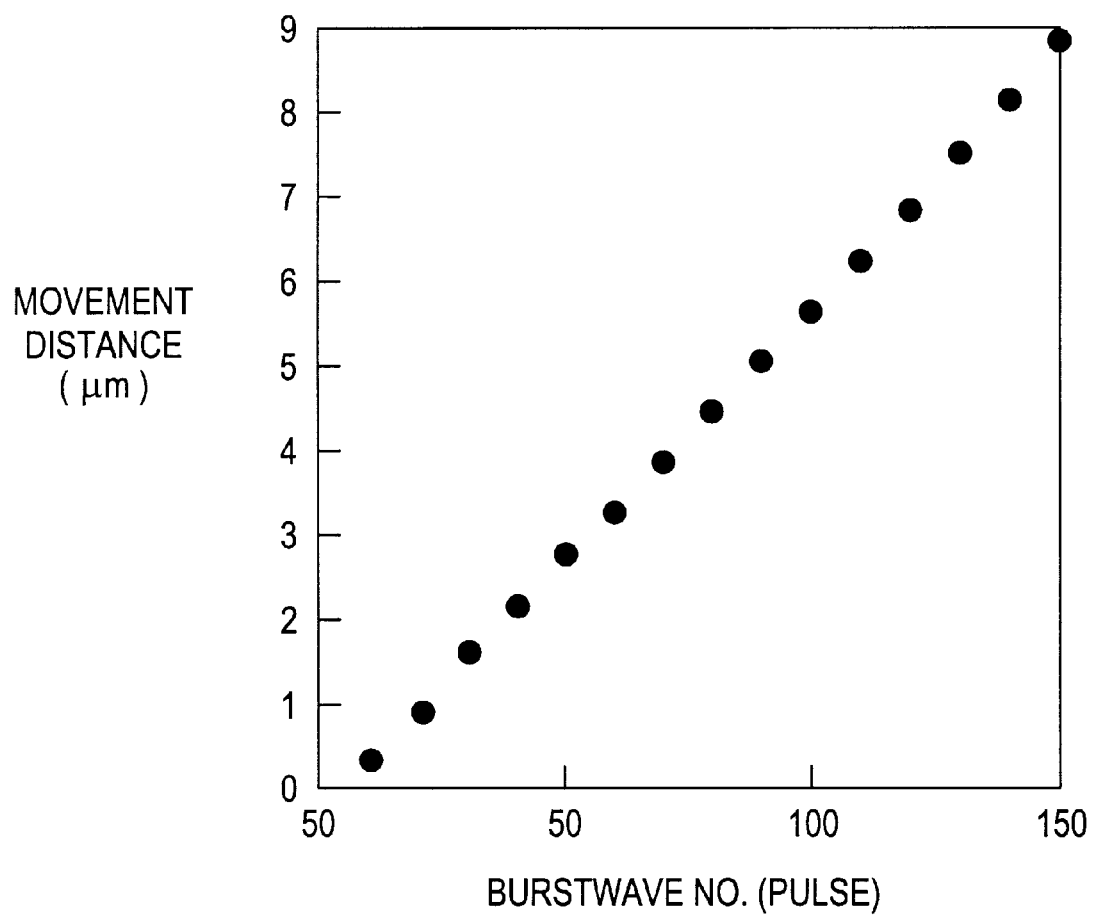
FIG. 3 is a graph showing one example of the relationship between burst wave number and distance of movement when the vibration actuator is driven according to one embodiment of the present invention.
Figure 4:
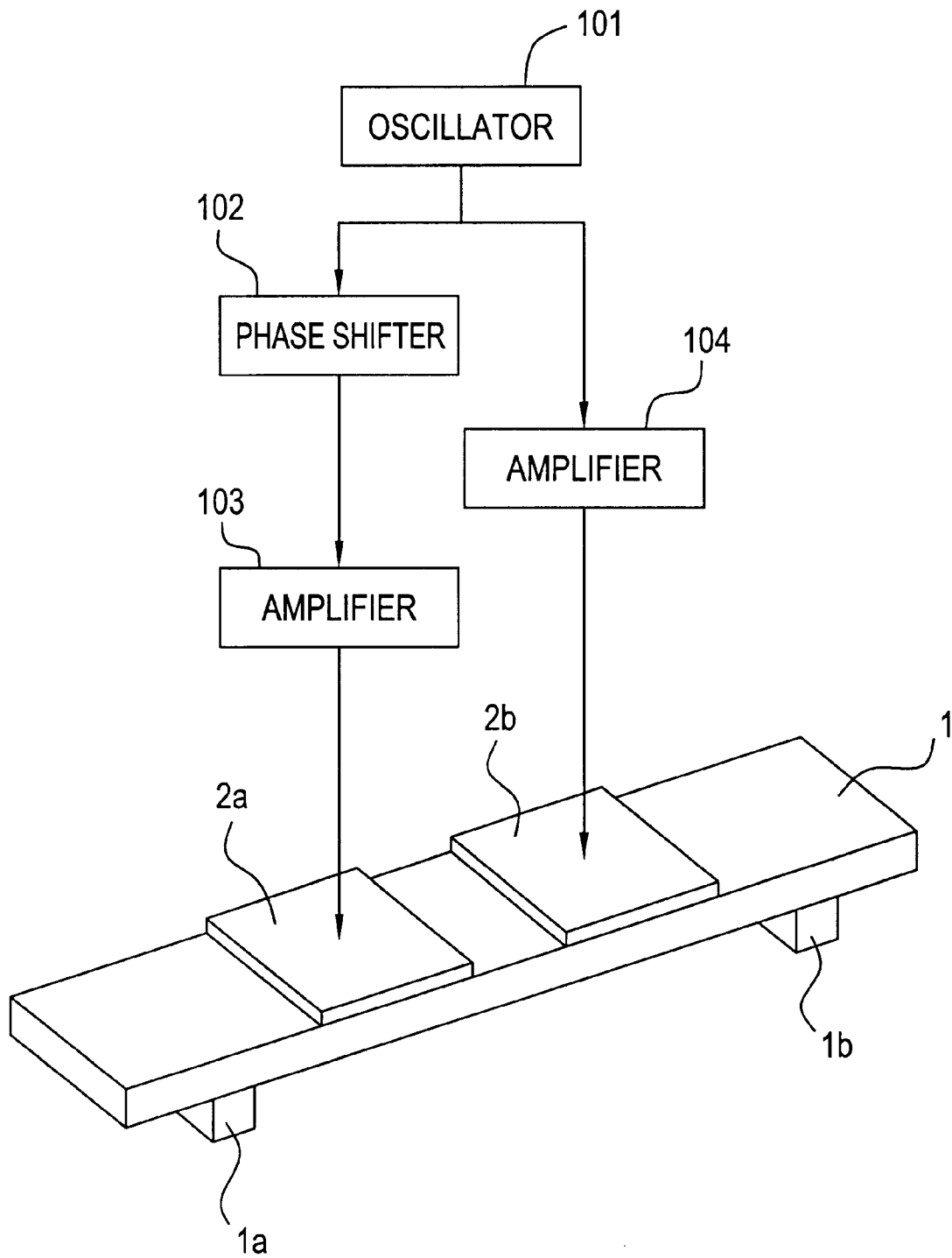
FIG. 4 is a perspective view showing one example of a conventional vibration actuator.
Figure 5:
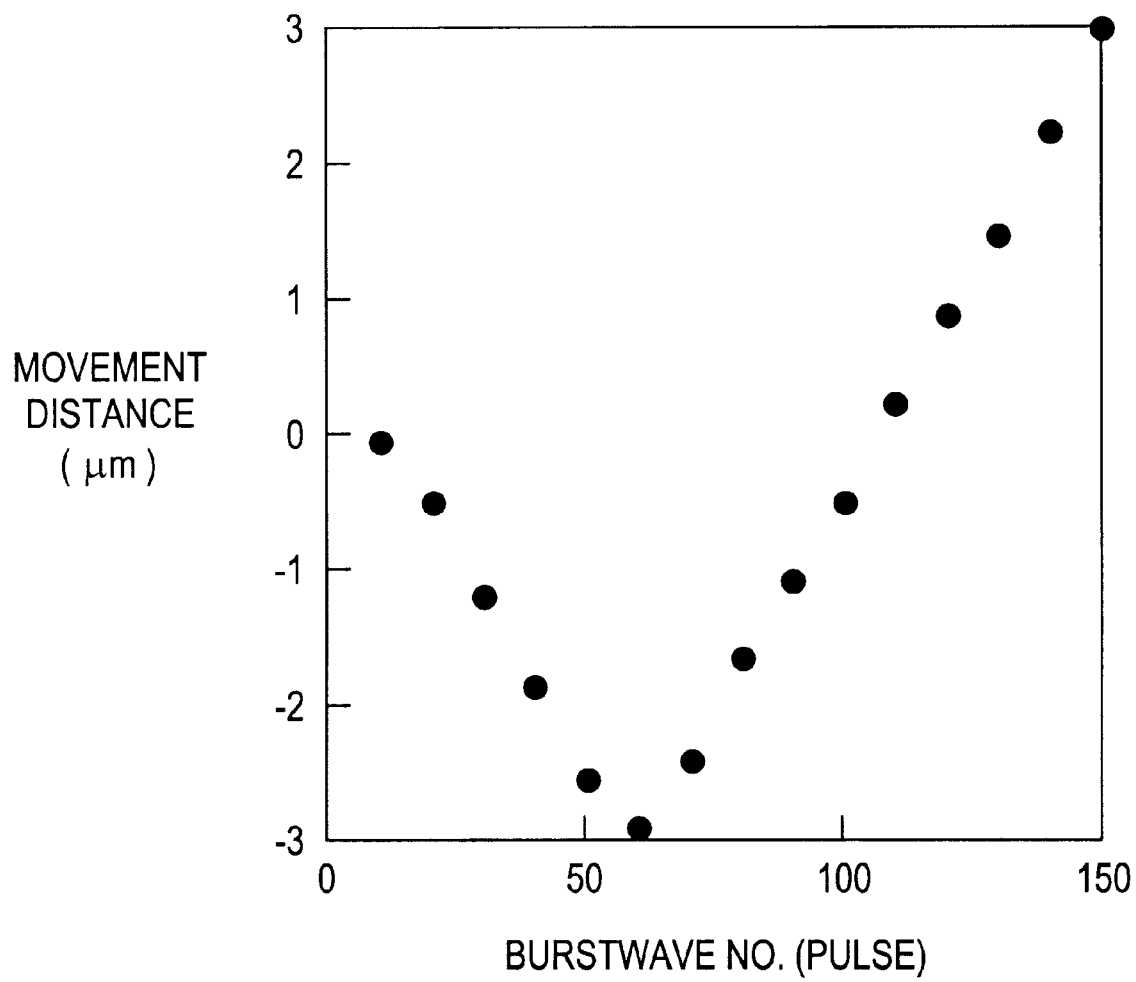
FIG. 5 is a graph showing one example of the relationship between burst wave number and distance of movement of a vibration actuator drive device according to the conventional example.

FIG. 3 is a graph showing one example of the relationship between the number of bursts (pulses) of oscillating waves and the distance of movement when the vibration actuator is driven with a single phase (supplied either to member 12a or member 12b) according to the present embodiment.

In the case of the present embodiment, with the number of burst waves being within a range of 10 to 150 bursts, movement occurs in the same direction as when continuous waves are applied regardless of the number of burst waves. Accordingly, it has become possible to control micromovement.

The phase difference of the alternating current voltage applied to the piezoelectric member 12a and the alternating current voltage applied to the piezoelectric member 12b is not limited to 90° (or −90°). The phase difference should be set appropriately to the value at which the maximum efficiency of the vibration actuator can be obtained, and the value (absolute value) may be changed according to the direction of driving.

Additionally, the piezoelectric member 12a and the piezoelectric member 12b may be configured both integrated as a single element. In this case, the same effect as with the configuration in FIG. 1 and FIG. 2 can be obtained if two mutually insulated electrodes are provided in the region where the piezoelectric element 12a and the piezoelectric element 12b are placed, and if two different phases of alternating current voltage are applied to these two electrodes. When the piezoelectric element is configured as a single element, the number of components is reduced and the efficiency of assembly can be improved.

The present invention is not limited to the embodiment explained above. Various modifications and alterations are possible.

For example, the described vibration actuator 10 used a first-order longitudinal vibration and a fourth-order bending vibration (L1-B4 type). The invention is not limited to this type of actuator. For example, the vibration actuator may also be made in a configuration using a sixth-order bending vibration (L1-B6 type), or the like.

Additionally, a piezoelectric member 12 was used as the electromechanical conversion element. The invention is not limited to this type of electromechanical conversion element. The invention is applicable to other devices that convert electrical energy into mechanical displacement. For example, an electrostrictive element may be used instead of the piezoelectric member.

If the vibration actuator is to be used for driving in only one direction, it may be configured to have either one of the piezoelectric member 12a or the piezoelectric member 12b provided on the elastic member 11.

As explained in detail above, according to the present invention, micromovement becomes possible without moving in the opposite direction even when drive is accomplished using bursts (pulses) of oscillating waves.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. A method of driving a vibration actuator which causes a relative movement with a relative moving member having an electromechanical converter that converts electrical energy to mechanical displacement to provide driving force upon application of drive signals to the electromechanical converter, the electromechanical converter including a first electrical energy input member and a second electrical energy input member provided on the electromechanical converter, the method comprising the steps of:

selecting a first drive mode for causing the relative movement in which vibration is caused by applying a first drive signal to the first electrical energy input member, and by applying a second drive signal having a different electrical phase from the first drive signal to the second electrical energy input member; and selecting a second drive mode for causing the relative movement in which vibration is caused by applying only one of the first drive signal and the second drive signal to only one of the first electrical energy input member and the second electrical energy input member.

2. The method of claim 1, wherein the drive signals applied to one of the first electrical energy input member and the second electrical energy input member in the second drive mode are burst signals.

3. The method of claim 2, wherein in the second drive mode, the one of the first and second electrical energy input members and the one of the first and second drive signals are selected and applied according to the direction of driving of the vibration actuator.

4. The method of claim 1, wherein the electromechanical converter includes a piezoelectric member.

5. A drive device comprising:

a vibration actuator which causes a relative movement with a relative moving member having an electromechanical converter that includes a first electrical energy input member and a second electrical energy input member, the electromechanical converter converting input electrical energy into mechanical displacement to obtain driving force upon application of drive signals to the electromechanical converter to cause vibration thereof;

a controller coupled to the vibration actuator to switch the vibration actuator between a first drive mode for causing the relative movement and a second drive mode for causing the relative movement, that is different from the first drive mode; and a drive circuit coupled to the controller and to the vibration actuator to apply a first drive signal to the first electrical energy input member and to apply a second drive signal to the second electrical energy input member when the controller is switched to the first drive mode, and to apply only one of the first drive signal and the second drive signal to only one of the first electrical energy input member and the second electrical energy input member for causing the relative movement when the controller is switched to the second drive mode.

6. The device of claim 5, wherein the drive circuit comprises:

an oscillator that generates a signal having a specified frequency and voltage;

a switch coupled to the oscillator and provided with a first output terminal connected to the first electrical energy input member and a second output terminal connected to the second electrical energy input member; and a phase shifter connected between the second output terminal and the second electrical energy input member to cause the electrical phase of the input signal to be changed by a specified amount; wherein the switch outputs signals from both the first output terminal and the second output terminal when in the first drive mode, and outputs signals from one of the first output terminal and the second output terminal when in the second drive mode.

7. The device of claim 5, wherein the drive circuit selects one of the first electrical energy input member and the second electrical energy input member according to the direction of driving of the vibration actuator, and applies one of the first drive signal and the second drive signal to the selected electrical energy input member when in the second drive mode.

8. The device of claim 5, wherein the electromechanical converter includes a piezoelectric member.

9. The device of claim 5, wherein in the first drive mode the first and second drive signals are continuous oscillating waves having different phases, and in the second drive mode the one drive signal is a burst wave.

10. A drive device comprising:

a vibration actuator which causes a relative movement with a relative moving member, having an electromechanical converter that converts electrical energy to mechanical displacement to provide driving force upon application of drive signals to the electromechanical converter to cause vibration thereof, the vibration actuator having a first electrical energy input member and a second electrical energy input member formed on the electromechanical converter; and a switch coupled to the vibration actuator to switch between a first drive mode for causing the relative movement that applies a first drive signal to the first electrical energy input member and applies a second drive signal having a different electrical phase from the first drive signal to the second electrical energy input member, and a second drive mode for causing the relative movement, that applies only one of the first drive signal and the second drive signal to only one of the first electrical energy input member and the second electrical energy input member.

11. The device of claim 10, wherein the drive signals applied to one of the first electrical energy input member and the second electrical energy input member in the second drive mode are burst waves.

12. The device of claim 10, wherein the switch includes a first output terminal coupled to the first electrical energy input member and a second output terminal coupled to the second electrical energy input member and the switch outputs signals from both the first output terminal and the second output terminal when in the first drive mode, and outputs signals from one of the first output terminal and the second output terminal when in the second drive mode.

13. The device of claim 10, wherein the electromechanical converter includes a piezoelectric member.

14. The device of claim 10, wherein in the first drive mode the first and second drive signals are continuous oscillating waves having different phases, and in the second drive mode the drive signal is a burst wave.

15. The method of claim 1, wherein the relative movement is caused by first-order longitudinal vibration and fourth-order bending vibration.

16. The device of claim 5, wherein the vibration actuator is moved by first-order longitudinal vibration and fourth-order bending vibration.

17. The device of claim 10, wherein the vibration actuator is moved by first-order longitudinal vibration and fourth-order bending vibration.

* * * * *